United States Patent [19]

Lohmar et al.

[11] 3,882,167
[45] May 6, 1975

[54] PROCESS FOR THE MANUFACTURE OF ACRYLIC ACID ESTERS

[75] Inventors: Elmar Lohmar, Cologne-Lindenthal; Alexander Ohorodnik, Erftstadt, Liblar; Klaus Gehrmann, Hurth-Knapsack; Paul Stutzke, Walberberg, all of Germany

[73] Assignee: Hoechst Aktiengesellschaft, Frankfurt am Main, Germany

[22] Filed: May 25, 1973

[21] Appl. No.: 363,863

[30] Foreign Application Priority Data
June 2, 1972 Germany............................ 2226829

[52] U.S. Cl........................ 260/486 R; 203/DIG. 6
[51] Int. Cl.............................................. C07c 69/54
[58] Field of Search................................ 260/486 R

[56] References Cited
UNITED STATES PATENTS
3,037,052  5/1962  Bortnick ........................ 260/486 R
3,278,585  10/1966  Baker......................... 260/DIG. 473

OTHER PUBLICATIONS
T.R.E. Kressman, Manufacturing Chemist, Nov. 1956, pp. 454–458.

Primary Examiner—Lorraine A. Weinberger
Assistant Examiner—Paul J. Killos
Attorney, Agent, or Firm—Connolly and Hutz

[57] ABSTRACT
Improved process permitting heterogeneous catalytic reactions to be carried out continuously in liquid phase, wherein a suspension of liquid starting material and fine particulate catalyst together with resulting reaction product is continuously conveyed upwardly in a reaction zone, in accordance with the principle underlying an airlift pump, by the introduction of a gas into, near the bottom of, the reaction zone, and recycled downwardly through a by-pass reflux line to the bottom of the reaction zone, the recycled liquid material passing through an injector system interrupting its flow, the said system being situated in the by-pass reflux line in a closed catalyst-separating zone containing reaction product; wherein, following establishment of the reaction equilibrium, starting material is continuously supplied to the reaction zone and crude, catalyst-free reaction product is removed near the head of the catalyst-separating zone; wherein reaction product, which is to be removed from the catalyst-separating zone, is caused to flow upwardly through the catalyst-separating zone with the injector system therein towards the reaction product outlet at velocity smaller than the sedimentation velocity of the catalyst in the catalyst-separating zone under the operational conditions prevailing.

The improved process is more particularly used for esterifying arcylic acid in contact with an acid ion exchanger as a catalyst, at elevated temperature and under pressures substantially between 0.01 and 1 atmosphere absolute. To this end, the reaction zone is continuously supplied with a starting mixture of acrylic acid and an alkanol having between 4 and 6 carbon atoms; an inert gas is introduced into, near the bottom of, the reaction zone; the resulting suspension is heated to boiling; an azeotropic mixture of water originating from the esterification, alkanol and/or ester, is distilled off in a distillation zone placed directly above the head of the reaction zone; the azeotropic mixture is condensed and separated into a specifically lighter, predominantly organic phase and into a specifically heavier, predominantly aqueous phase, the organic phase being recycled to the head of the distillation zone and/or to the reaction zone; and resulting crude alkyl acrylate is removed near the head of the catalyst-separating zone.

11 Claims, 1 Drawing Figure

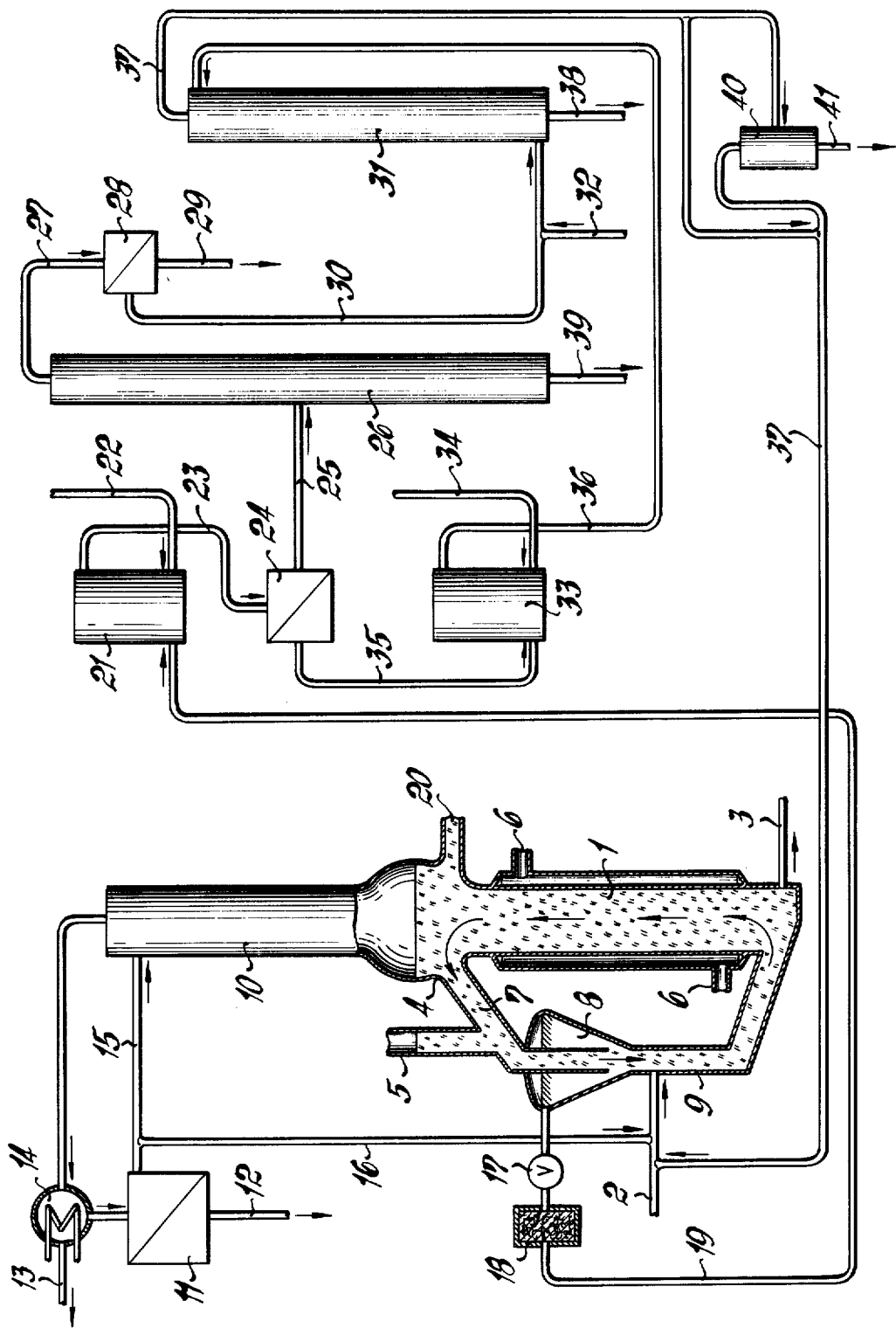

PROCESS FOR THE MANUFACTURE OF ACRYLIC ACID ESTERS

The esterification of acrylic acid with an alkanol containing between 4 and 6 carbon atoms, at elevated temperature and in contact with an acid ion exchanger as a catalyst, has already been described. These commercially available ion exchangers, which are based on cross-linked vinyl-aromatic polymers, have an "acid" character, thanks to the presence of sulfonyl groups therein.

For example, French Pat. No. 1,452,566 describes the esterification of a solution of acrylic acid in acetophenone or tributyl phosphate with the use of an excess of methanol, under the catalytic action of cation exchangers, such as "Amberlite IR–120" and "Diaion SK–102," in cascade arrangement. The resulting esters are obtained in relatively low yields of at most 78.8%, based on the quantity of acrylic acid in the aqueous starting solution. In addition to this, rather considerable proportions of by-products are obtained, originating from the large excess of methanol used.

A further process for the esterification of acrylic acid with butanol has been described in German Pat. No. 1,175,613, wherein the ion exchanger is placed on perforated or bubble trays in a bubble tray column. The resulting reaction water is removed azeotropically with butyl acrylate and butanol near the head of the column, whereas crude ester and unesterified acrylic acid, accumulating in the column base portion, are washed out, for example with the use of water and subjected to distillative finishing treatment. An adverse effect of this process resides in the need to use expensive facilities to prevent the ion exchanger from travelling downwardly from a higher to a lower bubble tray, upon a breakdown of the vapor column, if it ever occurs. A further adverse effect resides in that the ion exchanger on the bubble trays in the column is predominantly in contact with vaporized reactants. As a result, the column has a minor working capacity only which does not ensure contact between the reactants therein for the periods necessary to achieve satisfactory conversion rates. In other words, the production of commercial quantities of ester calls for the use of relatively big columns. In addition to this, there is a temperature gradient along the column which affects the esterification velocity. Still further, in all those cases in which consumed catalyst is to be removed from the tray column and/or fresh catalyst is to be supplied thereto, it is necessary for the production facilities to be stopped and opened, just to enable the fixed bed ion exchanger to be removed or replaced, in complicated manner.

The present invention now provides a process permitting heterogeneous catalytic reactions to be carried out continuously in liquid phase, in accordance with U.S. Pat. No. 3,829,478 wherein a suspension of liquid starting material and fine particulate catalyst together with resulting reaction product is continuously conveyed upwardly in a reaction zone, in accordance with the principle underlying an air-lift pump, by the introduction of a gas into, near the bottom of, the reaction zone, and recycled downwardly through a by-pass reflux line to the bottom of the reaction zone, the recycled liquid material passing through an injector system interrupting its flow, the said system being situated in the by-pass reflux line in a closed catalyst-separating zone containing reaction product; wherein, following establishment of the reaction equilibrium, starting material is continuously supplied to the reaction zone and crude, catalyst-free reaction product is removed near the head of the catalyst-separating zone; wherein reaction product, which is to be removed from the catalyst-separating zone, is caused to flow upwardly through the catalyst-separating zone with the injector system therein towards the reaction product outlet at a velocity smaller than the sedimentation velocity of the catalyst in the catalyst-separating zone under the operational conditions prevailing, the present process comprising esterifying acrylic acid in contact with an acid ion exchanger as a catalyst, at elevated temperature and under pressures substantially between 0.01 and 1 atmosphere absolute by continuously supplying the reaction zone with a starting mixture of acrylic acid and an alkanol having between 4 and 6 carbon atoms; introducing an inert gas into, near the bottom of, the reaction zone; heating the resulting suspension to boiling; distilling off, in a distillation zone placed directly above the head of the reaction zone, an azeotropic mixture of water originating from the esterification, alkanol and/or ester; condensing the said azeotropic mixture and separating it into a specifically lighter, predominantly organic phase and into a specifically heavier, predominantly aqueous phase, the organic phase being recycled to the head of the distillation zone and/or to the reaction zone; and discharging resulting crude alkyl acrylate, near the head of the catalyst-separating zone.

Further embodiments of the present invention, which can be used singly or in combination, comprise:

a. operating the reaction zone at temperatures between 45° and 120°C and under pressures between 30 and 500 mm of mercury;

b. supplying starting material to a plurality of analogous reaction zones, which are series-connected together and of which each has a distillation zone, a reflux line and a catalyst-separating zone associated therewith;

c. subjecting the crude alkyl acrylate, which is removed near the head of the catalyst-separating zone, to extraction with water so as to remove residual acrylic acid therefrom; isolating the aqueous phase and admixing it, if desired, with an alkali metal or alkaline earth metal salt, and separating the organic phase, in a second distillation zone, into a head product containing alcohol, water, dialkyl ether and alkyl acrylate, and into a base product consisting of desirable alkyl acrylate;

d. subjecting the crude alkyl acrylate, which is removed near the head of the catalyst-separating zone, to extraction with a solution of a base in water so as to remove residual acrylic acid therefrom; isolating the aqueous phase and acidifying it with a mineral acid; and separating the organic phase, in a second distillation zone, into a head product containing alkanol, water, dialkyl ether and alkyl acrylate, and into a base product consisting of desirable alkyl acrylate;

e. subjecting the head product originating from the second distillation zone to condensation to effect separation into an aqueous phase and an organic phase; removing the aqueous phase and introducing the organic phase into the lower base portion of an extraction column; introducing, from above into the extraction zone, countercurrently with respect to said organic phase, the earlier-separated aqueous, acrylic acid-containing phase; removing, near the head of the extraction zone, an organic extract containing acrylic acid, alkanol, alkyl acrylate, dialkyl ether and water and recycling the said extract, if desired, after distillation, to the reaction zone; and removing the extracted aqueous phase through the bottom of the extraction zone;

f. uniting the aqueous phases separated from the head products coming from the two distillation zones, with the aqueous phase removed through the bottom of the extraction zone; distilling the united phases and introducing resulting, predominantly organic head product into the lower base portion of the extraction zone.

The present invention enables acrylic acid to be transformed at high conversion rates and enables high yields to be produced at high catalyst performance. To this end, it is merely necessary to use a slight excess of alkanol. As a result, merely minor proportions of by-products are obtained. The process of the present invention further and always ensures a good distribution of the catalyst in the mixture, which is to undergo esterification, and a uniform temperature in the entire reaction mixture. This has been found favorably to effect the exchange of material on the surface and in the pores of the acid ion exchanger, where the esterification reaction primarily occurs, and to favorably effect catalyst performance.

A further advantage resides in the fact that it is possible for the ion exchanger to be readily removed from, or added to, the circulating mixture, through inlets opening into the reactor, without the need for shutdown of the production facilities. The mixture which is to undergo esterification may be passed through a single reactor or through a plurality of analogous reactors, if higher conversion rates are desirable.

The process of the present invention will now be described with reference to the accompanying flow scheme. As can be seen, a jacketed reactor 1 is filled with starting material (acrylic acid and alkanol) travelling through a conduit 2. Reactor 1 is further supplied, through a conduit 3, with a minor proportion of an inert gas, preferably air, which promotes circulation of the liquid in the direction of the arrows and which is intended to stabilize the fluidization of the liquid phase, that is a homogeneous suspension. Once the material in reactor 1 is at the level of overflow 4, it is admixed, through inlet 5, with a commercially available, fine particulate acid ion exchanger, for example with an Amberlite, Dowex or Lewatite grade exchanger. Heat is supplied through inlets 6 which open into the jacket of the reactor until the mixture therein commences boiling, under pressures between 0.01 and 1 atmosphere absolute. The resulting bubbles, which ascend in the reactor, and the air introduced thereinto cause upward circulation of the homogeneous suspension through conduit 7, separator 8, conduit 9 and reactor 1, in accordance with the principle underlying an air-lift pump. Resulting distillate and air are removed near the head of a (first) distilling column 10, which is mounted on to reactor 1. The distillate is condensed in condenser 14 and separated in separator 11 into an organic phase, consisting of acrylic acid ester, alkanol and water, and into an organic phase which equally contains acrylic acid ester, alkanol and water, however in a different quantitative ratio. The aqueous phase is removed through conduit 12. Air is removed from the plant through conduit 13, which can be used as a vacuum conduit, if desired or necessary. The organic phase is refluxed to distillation column 10, through conduit 15 and/or conduit 16, or recycled to the reactor, through conduit 2 and reactor inlet 9. Fresh starting material is supplied to the system at a rate consistent with the reaction and dehydration of the recycle mixture. At the same time, resulting reaction product is taken from separator 8 by opening valve 17, and conveyed to filter means 18 and conduit 19. The velocity of flow of the reaction product is smaller than the velocity of sedimentation of the catalyst. As a result, the removal of catalyst together with the reaction product is avoided. The process just described also enables the acid ion exchanger to be removed from, or fed to, the system, through outlet 20 and inlet 5, respectively, without the need to discontinue operation.

Crude alkyl acrylate is delivered to a washing or neutralization zone 21, through conduit 19, and freed therein from unesterified acrylic acid by means of water or by means of an aqueous solution of a base, such as $NaOH$, $K_2CO_3$ or $NaHCO_3$, for example, flowing through conduit 22. The resulting mixture of crude ester and aqueous phase is conveyed to separator 24, through conduit 23, from where the crude ester is delivered, through conduit 25, to a (second) distillation column 26. In column 26, a mixture of alkanol, water, dialkyl ether and alkyl acrylate is distilled off through head conduit 27 and conveyed to separator 28, in which it is separated into an organic phase and an aqueous phase, the latter being removed through conduit 29.

The organic phase and head product, which comes from a water-stripping zone, wherein water removed through conduits 12, 29 and 38 is distilled and freed from alkanol and alkyl acrylate, and which travels through conduit 32, are conveyed jointly through conduit 30 and introduced into the base portion of extraction column 31. Conduit 36 opening into the upper portion of the extraction column is used to supply the column with an aqueous phase, which originates from the acrylic acid separation zone and which has been conveyed from separator 24, through conduit 35, to vessel 33. If use is made of a base to effect the separation of acrylic acid in vessel 21, the aqueous phase is acidified by means of a mineral acid, for example $HCl$, $H_2SO_4$ or $H_3PO_4$, travelling through conduit 34, so as to establish a pH between 1 and 3, which enables the acrylic acid to be set free from its salt, e.g., from sodium acrylate. If use is made of water to effect the separation of acrylic acid in vessel 21, then the aqueous phase is introduced into the upper end of extraction column 31, through conduit 36, with or without addition of a salt, such as $NaCl$, $KCl$, $CaCl_2$ or $Na_2SO_4$.

The organic extract obtained at the head of extraction column 31 contains alkanol, dialkyl ether, alkyl acrylate, water and further by-products together with the overall quantity of acrylic acid, which remained unesterified in reactor 1, all of these constituents being dissolved therein. The extract is returned to the reactor, through conduits 37 and 2, if desired following distillation in column 40. In this latter case, higher-boiling impurities are obtained as the base product of column 40, which are removed through conduit 41. Extracted water is delivered from extraction column 31 to the water-stripping stage (not shown in the drawing) through conduit 38. The alkyl acrylate obtained in column 26 may be further purified, if desired, by introducing it through conduit 39 into a further distillation column (now shown in the drawing).

The extraction in column 31 produces waste water practically free from organic impurities, which is highly desirable for reasons of environmental control, and enables the overall quantity of acrylic acid unesterified in the reactor to be recovered, which is highly desirable for reasons of economy.

EXAMPLE 1

Preparation of acrylic acid-n-butyl ester (n-butyl acrylate)

A pilot plant arranged substantially as shown in the accompaning flow scheme was used. A 15 liter reactor 1 was charged with a starting mixture of 5.15 kg(71.5 mols) of acrylic acid and 6.85 kg (92.5 mols) of n-butanol. Following this, the mixture was circulated by introducing air thereinto until the introduction of 1200 g (dry weight) of a sulfonic acid Lewatite ion exchanger, which was aqueous, soaked material, was complete, through inlet 5. The catalyst was used in the form of particles with a size between 0.3 and 1.2 mm. By means of a jacket heater, the material in the reactor was heated to a temperature of 90°C, and a pressure substantially of 190 mm of mercury was established in the apparatus. These conditions made the mixture boil and an azeotrope, consisting of n-butyl acrylate, butanol and water, was removed near the head of the column. The mixture was separated into an aqueous phase and an organic phase. 25 liters/hr of air were supplied through conduit 3. Once the esterification equilibrium was found to have been established, conduit 2 was used for the supply, per hour, of 712 g (9.9 mols) of acrylic acid, 758 g (10.15 mols) of n-butanol and 412.5 g of a mixture (return material), which consisted of 25 g of water, 15.2 g of acrylic acid, 194 g of n-butanol, 152 g of n-butyl acrylate and 26.3 g of by-products (dibutyl ether, butyl acetate and similar materials), originated from extraction column 31 and travelled through conduit 37 into conduit 2. By azeotropic distillation, the reaction water was removed from the recycle material in column 10, and 193 g/hr of an aqueous phase, which contained 10.4 g of butanol, were removed from separator 11, through conduit 12.

1.69 kg/hr of an esterified mixture, which contained 5.02 weight % of acrylic acid (this corresponded to an acrylic acid conversion rate of 88.4%) were removed from reactor 1, through filter 18 and conduit 19, and delivered to an analogous reactor. In this latter reactor, the esterified mixture was admixed with a further 1200 g of acid ion exchanger, which was aqueous, soaked material, and subjected to further reaction, while the resulting reaction water was distilled off azeotropically. The second reactor was operated at 80°C under a pressure of 105 mm of mercury and charged with 25 liters/hr of air.

1.668 kg of crude ester, which contained 0.94 weight % of acrylic acid (this corresponded to an acrylic acid conversion rate of 97.9%) were removed from the second reactor through attachments corresponding to valve 17, filter 18 and conduit 19. The crude ester was neutralized in vessel 21 with 270 ml/hr of a saturated NaHCO$_3$-solution, the resulting aqueous phase was removed and the organic phase was freed from butanol, water, dibutyl ether and further low-boiling by-products, in column 26 under a pressure of 50 mm of mercury. Some n-butyl acrylate was found also to distill over. 364 g/hr of organic phase and 7.5 g/hr of aqueous phase were separated from one another, in separator 28. 1.54 kg/hr of butyl acrylate together with 4.15 weight % of high boilers, which were subjected to further distillation, were removed from the column base portion. The 364 g of organic phase originating from the head product of column 26 were delivered, through conduit 30 and jointly with 26 g/hr of head product, which substantially consisted of butanol and water, travelled through conduit 32, and came from a water-stripping zone (not shown in the drawing), to extraction column 31. The aqueous phase coming from neutralization vessel 21 via separator 24 was acidified with sulfuric acid, in container 33, and equally introduced into extraction column 31, through conduit 36. The organic extract effluent was conveyed through conduit 37 into distillation column 40, of which the head product (412.5 g/hr) was recycled to reactor 1, through conduits 37 and 2. Base product together with contaminants was removed through conduit 41. Extracted water was removed from extraction column 31, through conduit 38, and conveyed to the water-stripping zone.

Pure n-butyl acrylate was obtained in a yield of 95%, based on the acrylic acid which underwent conversion. The catalyst performance was found to be 501 g of n-butyl acrylate per kg of ion exchanger per hour.

EXAMPLE 2

Preparation of 2-pentyl acrylate.

An apparatus the same as that described in Example 1 was fed with 4.56 kg (63.4 mols) of acrylic acid, 7.36 kg (83.5 mols) of 2-pentanol and 1200 g of Lewatite (aqueous, soaked) and the whole was heated to 90°-91°C under a pressure of 190 mm of mercury, while air was introduced at a rate of 25 l/hr. These conditions made the mixture boil and circulate. 570 g/hr (7.92 mols) of acrylic acid, 724 g/hr (8.23 mols) of 2-pentanol and 364 g/hr of a mixture (return material), which consisted of 12 g of water, 15 g of acrylic acid, 171 g of 2-pentanol, 147 g of pentyl acrylate and 19 g of by-products, were introduced and 156 g of an aqueous phase, that contained 5 g of 2-pentanol, were removed from the recycle material, by azeotropic distillation.

The crude ester, which came from the first reactor (1502 g containing 4.44 weight % of acrylic acid) was introduced into a second reactor equally charged with 1200 g of Lewatite (aqueous, soaked), wherein the reaction water was distilled off azeotropically, at 80°C under a pressure of 100 mm of mercury.

1466 g/hr of crude ester, which contained 1.03 weight % of acrylic acid and which was neutralized with 200 ml/hr of a saturated NaHCO$_3$-solution, were taken from the second reactor. In column 26, which was operated under a pressure of 50 mm of mercury, there were distilled off 339.6 g of head product, of which 6.6 grams were found to separate as an aqueous phase, in separator 28. 1100 g of crude ester containing 3.98 weight % of high boilers, which were subjected to further distillation, were removed from the column base, through conduit 39.

The 333 g of organic phase, which originated from the head product of column 26, were conveyed jointly with 11.6 g of a head product, which came from a water-stripping zone, through conduit 32, where introduced into extraction column 31, through conduit 30, wherein the acidified neutralization water coming from separator 24, was extracted. The organic extract was distilled in column 40 and the head product (364 g/hr) was recycled to the reactor, through conduits 37 and 2.

The acrylic acid conversion rate was 97.4%. Pure 2-pentyl acrylate was obtained in a yield of 94.5%, based on the conversion rate. The catalyst performance was 440 g of 2-pentyl acrylate per kg of ion exchanger per hour.

We claim:

1. A process permitting heterogeneous catalytic reactions to be carried out continuously in liquid phase, wherein a suspension of liquid starting material and fine particulate catalyst together with resulting reaction product is continuously conveyed upwardly in a reaction zone, in accordance with the principle underlying an air-lift pump, by the introduction of a gas into, near the bottom of, the reaction zone, and recycled downwardly through a by-pass reflux line to the bottom of the reaction zone, the recycled liquid material passing through an injector system interrupting its flow, the said system being situated in the by-pass reflux line in a closed catalyst-separating zone containing reaction product; wherein, following establishment of the reaction equilibrium, starting material is continuously supplied to the reaction zone and crude, catalyst-free reaction product is removed near the head of the catalyst-separating zone; wherein reaction product, which is to be removed from the catalyst-separating zone, is caused to flow upwardly through the catalyst-separating zone with the injector system therein towards the reaction product outlet at a velocity smaller than the sedimentation velocity of the catalyst in the catalyst-separating zone under the operational conditions prevailing; which process comprises esterifying acrylic acid in contact with an acid ion exchanger as a catalyst, at elevated temperature and under pressures substantially between 0.01 and 1 atmosphere absolute by continuously supplying the reaction zone with a starting mixture of acrylic acid and an alkanol having between 4 and 6 carbon atoms; introducing an inert gas into, near the bottom of, the reaction zone; heating the resulting suspension to boiling; distilling off, in a distillation zone placed directly above the head of the reaction zone, an azeotropic mixture of water originating from the esterification, alkanol and/or ester; condensing the said azeotropic mixture and separating it into a specifically lighter, predominantly organic phase and into a specifically heavier, predominantly aqueous phase, the organic phase being recycled to the head of the distillation zone and/or to the reaction zone; and discharging resulting crude alkyl acrylate, near the head of the catalyst-separating zone.

2. The process as claimed in claim 1, wherein the reaction zone is operated at temperatures between 45° and 120°C and under pressures between 30 and 500 mm of mercury.

3. The process as claimed in claim 1, wherein a plurality of analogous reaction zones are series-connected together, each of the individual reaction zones having a distillation zone, a reflux line and a catalyst-separating zone associated therewith.

4. The process as claimed in claim 1, wherein the crude alkyl acrylate, which is removed near the head of the catalyst-separating zone, is subjected to extraction with water so as to remove residual acrylic acid therefrom;

the resulting aqueous phase is separated;

and the organic phase is delivered to a second distillation zone and separated therein into a head product containing alkanol, water, dialkyl ether and alkyl acrylate, and into a base product consisting of desirable alkyl acrylate.

5. The process as claimed in claim 1, wherein the crude alkyl acrylate, which is removed near the head of the catalyst-separating zone, is subjected to extraction with a solution of a base in water so as to remove residual acrylic acid therefrom; the resulting aqueous phase is separated and the organic phase is delivered to a second distillation zone and separated therein into a head product containing alkanol, water, dialkyl ether and alkyl acrylate, and into a base product consisting of desirable alkyl acrylate.

6. The process as claimed in claim 1, wherein the crude alkyl acrylate, which is removed near the head of the catalyst-separating zone, is subjected to extraction with water so as to remove residual acrylic acid therefrom; the resulting acrylic acid-containing aqueous phase is separated; the organic phase is delivered to a second distillation zone and separated therein into a head product containing alkanol, water, dialkyl ether and alkyl acrylate, and into a base product consisting of desirable alkyl acrylate; the head product originating from the second distillation zone is subjected to condensation to effect separation into an aqueous phase and an organic phase; the aqueous phase is removed and the organic phase is introduced into the lower base portion of an extraction zone; an aqueous, acrylic acid-containing phase separated earlier is introduced, from above, into the extraction zone, countercurrently with respect to the said organic phase; an organic extract containing acrylic acid, alkanol, alkyl acrylate, dialkyl ether and water is removed near the head of the extraction zone and recycled to the reaction zone; and the extracted aqueous phase is removed through the bottom of the extraction zone.

7. The process as claimed in claim 6, wherein the aqueous phases, originating from the head products coming from the two distillation zones are united with the aqueous phase removed through the bottom of the extraction zone; the united phases are distilled and resulting, predominantly organic head product is equally introduced into the lower base portion of the extraction zone.

8. The process as claimed in claim 1, wherein the crude alkyl acrylate, which is removed near the head of the catalyst-separating zone, is subjected to extraction with water so as to remove residual acrylic acid therefrom; the resulting aqueous phase is separated and admixed with an alkali metal or alkaline earth metal salt; the organic phase is delivered to a second distillation zone and separated therein into a head product containing alkanol, water, dialkyl ether and alkyl acrylate, and into a base product consisting of desirable alkyl acrylate; the head product originating from the second distillation zone is subjected to condensation to effect separation into an aqueous phase and an organic phase; the aqueous phase is removed and the organic phase is introduced into the lower base portion of an extraction zone; an aqueous, acrylic acid-containing phase separated earlier and admixed with an alkali metal or alkaline earth metal salt is introduced from above into the extraction zone, countercurrently with respect to said organic phase; an organic extract containing acrylic acid, alkanol, alkyl acrylate, dialkyl ether and water is removed near the head of the extraction zone and recycled to the reaction zone; and the extracted aqueous phase is removed through the bottom of the extraction zone.

9. The process as claimed in claim 8, wherein the aqueous phases separated from the head products coming from the two distillation zones are united with the aqueous phase removed through the bottom of the extraction zone; the united phases are distilled and resulting, predominantly organic head product is equally introduced into the lower base portion of the extraction zone.

10. The process as claimed in claim 1, wherein the crude alkyl acrylate, which is removed near the head of the catalyst-separating zone, is subjected to extraction with a solution of a base in water so as to remove residual acrylic acid therefrom; the resulting aqueous phase is separated and acidified with a mineral acid; the organic phase is delivered to a second distillation zone and separated therein into a head product containing alkanol, water, dialkyl ether and alkyl acrylate, and into a base product consisting of desirable alkyl acrylate; the head product originating from the second distillation zone is subjected to condensation to effect separation into an aqueous phase and an organic phase; the aqueous phase is removed and the organic phase is introduced into the lower base portion of an extraction column; an aqueous phase acidified earlier with a mineral acid is introduced from above into the extraction zone, countercurrently with respect to said organic phase; an organic extract containing acrylic acid, alkanol, alkyl acrylate, dialkyl ether and water is removed near the head of the extraction zone and recycled to the reaction zone; and the extracted aqueous phase is removed through the bottom of the extraction zone.

11. The process as claimed in claim 10, wherein the aqueous phases separated from the head products coming from the two distillation zones are united with the aqueous phase removed through the bottom of the extraction zone; the united phases are distilled and resulting, predominantly organic head product is equally introduced into the lower base portion of the extraction zone.

* * * * *